United States Patent
Zhang et al.

(10) Patent No.: US 10,012,791 B2
(45) Date of Patent: Jul. 3, 2018

(54) RUBBER FRAME, BACKLIGHT MODULE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jun Zhang, Beijing (CN); Qianqian Gao, Beijing (CN); Linhua Wang, Beijing (CN); Chao Lv, Beijing (CN); Ting Liu, Beijing (CN); Tao Wang, Beijing (CN); Heng Li, Beijing (CN); Xi Chen, Beijing (CN); Jiancheng Wu, Beijing (CN); Faxin Qu, Beijing (CN); Wei Wang, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/306,808

(22) PCT Filed: Mar. 2, 2016

(86) PCT No.: PCT/CN2016/075273
§ 371 (c)(1),
(2) Date: Oct. 26, 2016

(87) PCT Pub. No.: WO2017/054410
PCT Pub. Date: Apr. 6, 2017

(65) Prior Publication Data
US 2017/0269290 A1 Sep. 21, 2017

(30) Foreign Application Priority Data

Sep. 30, 2015 (CN) .......................... 2015 1 0640709

(51) Int. Cl.
*F21V 8/00* (2006.01)

(52) U.S. Cl.
CPC ................................. *G02B 6/0088* (2013.01)

(58) Field of Classification Search
CPC .................................................... G02B 6/0088
(Continued)

(56) References Cited

U.S. PATENT DOCUMENTS 8,582,048 B2 * 11/2013 Yu ........................ G02B 6/0088
349/58
2005/0280746 A1 12/2005 North et al.
(Continued)

FOREIGN PATENT DOCUMENTS

CN 200965599 Y 10/2007
CN 101393341 A 3/2009
(Continued)

OTHER PUBLICATIONS

First Office Action for Chinese Application No. 201510640709.2, dated Nov. 1, 2017, 6 Pages.
(Continued)

*Primary Examiner* — Laura Tso
(74) *Attorney, Agent, or Firm* — Brooks Kushman P.C.

(57) ABSTRACT

A rubber frame, a backlight module and a display device are provided by the present disclosure, the rubber frame is applied to the backlight module and includes a soft rubber body. The soft rubber body includes a first section, a second section, a third section and a fourth section. At least one section is provided with a first fixing portion configured to fix a display panel.

18 Claims, 5 Drawing Sheets

(58) Field of Classification Search
USPC ..... 362/97.1, 633, 632, 634, 217.11, 217.15, 362/362–375
See application file for complete search history.

(56) References Cited

U.S. PATENT DOCUMENTS

| | | | | |
|---|---|---|---|---|
| 2012/0307175 A1* | 12/2012 | Zhou | .................. | G02B 6/009 349/61 |
| 2013/0058132 A1* | 3/2013 | Chou | .................. | G09F 13/04 362/633 |
| 2013/0077014 A1* | 3/2013 | Yang | ................ | G02F 1/133308 349/58 |
| 2014/0029295 A1 | 1/2014 | Hsiao et al. | | |
| 2015/0002785 A1* | 1/2015 | Huang | ................ | G02B 6/0066 349/65 |
| 2015/0331179 A1* | 11/2015 | Li | .................. | G02F 1/133608 362/615 |
| 2015/0346540 A1* | 12/2015 | Bu | ................ | G02F 1/133308 349/60 |
| 2015/0362787 A1* | 12/2015 | Yuan | ................ | G02F 1/133308 349/58 |
| 2015/0370003 A1* | 12/2015 | Zhu | .................. | G02B 6/0073 362/612 |
| 2016/0091760 A1* | 3/2016 | Ogura | ................ | G02F 1/133611 349/69 |
| 2016/0291386 A1* | 10/2016 | Wang | ................ | G02B 6/00 |
| 2017/0269288 A1* | 9/2017 | Zhang | ................ | G02B 6/0088 |
| 2017/0269290 A1 | 9/2017 | Zhang et al. | | |

FOREIGN PATENT DOCUMENTS

| | | |
|---|---|---|
| CN | 101393351 A | 3/2009 |
| CN | 102809838 A | 12/2012 |
| CN | 103576359 A | 2/2014 |
| CN | 105158988 A | 12/2015 |
| CN | 205067929 U | 3/2016 |
| JP | H07168195 A | 7/1995 |
| WO | 2014208128 A1 | 12/2014 |

OTHER PUBLICATIONS

International Search Report and Written Opinion for Application No. PCT/CN2016/075273, dated Jun. 29, 2016, 11 Pages.

* cited by examiner

RUBBER FRAME, BACKLIGHT MODULE AND DISPLAY DEVICE

CROSS-REFERENCE TO RELATED APPLICATIONS

This application is the U.S. national phase of PCT Application No. PCT/CN2016/075273 filed on Mar. 2, 2016, which claims priority to Chinese Patent Application No. 201510640709.2 filed on Sep. 30, 2015, the disclosures of which are incorporated in their entirety by reference herein.

TECHNICAL FIELD

The present disclosure relates to the field of display technology, and in particular to a rubber frame, a backlight module and a display device.

BACKGROUND

Liquid crystal display devices with light weight, thin size, low power consumption and other advantages, are widely applied in the modern information equipment. The liquid crystal display itself can not emit light and needs to rely on a backlight source which provides sufficient and uniformly distributed light from to achieve the display function, so the performance of the backlight module directly affects the quality of the liquid crystal display.

A backlight module in the related art generally includes a back plate, a backlight component provided on the back plate and a rubber frame. The rubber frame is usually made of a hard material. In the process of combining the backlight module and a display panel, it is easy to break the display panel, or the interference between the rubber frame and corners of the display panel results in rubber frame scraps, foreign matters and so on.

SUMMARY

In view of the above, the present disclosure provides a rubber frame, a backlight module, and a display device, for solving the problem that in the process of combining the backlight module and a display panel, a hard rubber frame easily results in the breakage of the display panel, or that the interference between the rubber frame and corners of the display panel results in rubber frame scraps and foreign matter.

In order to solve the above technical problem, a rubber frame which is applied to a backlight module is provided by the present disclosure, including a soft rubber body. The soft rubber body includes a first section, a second section, a third section, and a fourth section. At least one of the sections is provided with a first fixing portion configured to fix a display panel.

Optionally, the section with the first fixing portion includes a first sub-section and a second sub-section which are separated from each other, and the first fixing portion is a gap between the first sub-section and the second sub-section.

Optionally, the first fixing portion is a groove arranged in the at least one section.

Optionally, the first fixing portion is arranged in the first section, and the first section is an upper section.

Optionally, the first fixing portion is configured to receive a display panel fixing adhesive tape.

Optionally, at least one section is provided with a second fixing portion configured to receive a rubber frame fixing adhesive tape.

Optionally, the second fixing portion is a groove arranged in the at least one section.

Optionally, at least one section is provided with a film fixing portion configured to fix an optical film in the backlight module.

Optionally, each of the second section and the fourth section is provided with the film fixing portion, the second section is a right section, and the fourth section is a left section.

Optionally, the first section, the second section, the third section and the fourth section are connected to each other in an end-to-end manner, the first section and the third section are opposite to each other, and the second section and the fourth section are opposite to each other. The first section, the second section, the third section and the fourth section have an identical thickness.

Optionally, the film fixing portion is a fixing clamping slot.

A backlight module is further provided by the present disclosure, including a back plate and a backlight component and a rubber frame hereinabove and arranged on the back plate.

Optionally, the backlight module further includes: a display panel fixing adhesive tape arranged in the first fixing portion;

a thickness of the display panel fixing adhesive tape is greater than a thickness of the section with the first fixing portion.

Optionally, the thickness of the display panel fixing adhesive tape is greater than the thickness of the section with the first fixing portion by 0.02 to 0.05 millimeters.

Optionally, a width of the display panel fixing adhesive tape is identical to a width of the section with the first fixing portion.

Optionally, at least one section is provided with the second fixing portion, and the backlight module further includes a rubber frame fixing adhesive tape arranged in the second fixing portion and configured to fix the rubber frame to the back plate.

Optionally, a thickness of the display panel fixing adhesive tape extending from the back plate along a first direction is greater than a thickness of the section with the first fixing portion extending from the back plate along the first direction. The first direction is perpendicular to the back plate and directed from the back plate to the display panel.

Optionally, the rubber frame fixing adhesive tape is adhered onto a surface of the at least one section toward the back plate.

Optionally, the second fixing portion is a groove arranged in the at least one section.

A display device is further provided by the present disclosure, including the backlight module hereinabove.

The advantages of the technical solution hereinabove of the present disclosure are as follows:

The rubber frame of the backlight module is soft and resilient, so the interference between the rubber frame and corners of the display panel may not occur in the process of assembling the display panel, such that the breakage of the display panel and the rubber frame scraps and foreign matter may be avoided, thereby improving the quality of the display device and reducing the manufacturing cost. Furthermore, the soft rubber frame is more flexible and easy to be disassembled, thereby improving the recycling efficiency of the backlight module. In addition, the rubber frame is provided thereon with a fixing portion for fixing the display panel, so as to fix the display panel conveniently.

DETAILED DESCRIPTION

Figure 1:
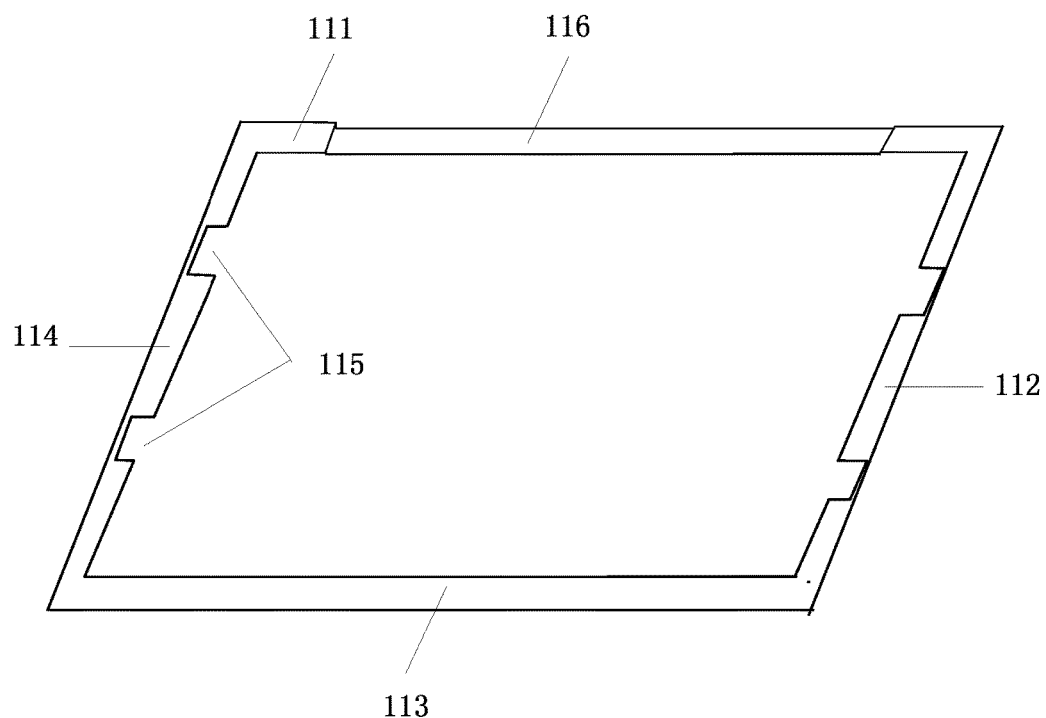
FIG. 1 is a top view of a rubber frame in some embodiments of the present disclosure.

The present disclosure will be described hereinafter in conjunction with the drawings and embodiments. The following embodiments are for illustrative purposes only, but shall not be used to limit the scope of the present disclosure.

A rubber frame applied in a backlight module is provided in some embodiments of the present disclosure. The rubber frame includes a soft rubber body. Sections of the soft rubber body include a first section, a second section, a third section and a fourth section, and at least one section is provided with a first fixing portion configured to fix a display panel.

The soft rubber may be soft polyvinyl chloride (PVC), silica gel, ethylene-vinyl acetate copolymer (EVA), ethylene-octene copolymer (POE), styrenic thermoplastic elastomer (TPES) and the like.

The rubber frame of the backlight module is soft and resilient, so the interference between the rubber frame and corners of the display panel may not occur in the process of assembling the display panel, such that the breakage of the display panel and the rubber frame scraps and foreign matter may be avoided, thereby improving the quality of the display device and reducing the manufacturing cost. Furthermore, the soft rubber frame is more flexible and easy to be disassembled, thereby improving the recycling efficiency of the backlight module. In addition, the rubber frame is provided thereon with a fixing portion for fixing the display panel, so as to fix the display panel conveniently.

In some embodiments of the present disclosure, the section with the first fixing portion includes a first sub-section and a second sub-section which are separated from each other, and the first fixing portion is a gap between the first sub-section and the second sub-section.

In some embodiments of the present disclosure, the first fixing portion may further be a groove arranged in the section.

Optionally, the first fixing portion is arranged in the first section, and the first section is an upper section.

Optionally, the first fixing portion is configured to receive a display panel fixing adhesive tape. That is, the display panel is fixed by the display panel fixing adhesive tape. Of course, in other embodiments of the present disclosure, the display panel may also be fixed in other ways, such as using a snap.

Optionally, at least one section is provided with a second fixing portion configured to receive a rubber frame fixing adhesive tape, so as to fix the rubber frame to the back plate of the backlight module by the rubber frame.

Optionally, the second fixing portion is a groove arranged in the section, so that a thickness of the section receiving the rubber frame fixing adhesive tapes not greater than a thickness of any of the other sections.

Optionally, at least one section is further provided with a film fixing portion for fixing the optical film in the backlight module, so as to avoid the displacement of the optical film, improve the light-emitting efficiency of the backlight module, and prevent the optical film from detaching when assembling the backlight module.

Optionally, each of the second section and the fourth section is provided with the film fixing portion, the second section is a right section, and the fourth section is a left section.

Optionally, the film fixing portion is a fixing clamping slot formed in the corresponding section, thereby conveniently fixing the optical film.

Referring to FIG. 1, which is a top view of a rubber frame in some embodiments of the present disclosure, the rubber frame includes a soft rubber body formed by a first section 111, a second section 112, a third section 113 and a fourth section 114. The first section 111, the second section 112, the third section 113 and the fourth section 114 are connected to each other in an end-to-end manner. The first section 111 and the third section 113 are opposite to each other, and the second section 112 and the fourth section 114 are opposite to each other. The first section 111 is an upper section, and the first section 111 is provided with a first fixing portion 116 for receiving a display panel fixing adhesive tape. The first fixing portion 116 is a groove formed in the first section 111.

In some embodiments of the presents disclosure, the display panel fixing adhesive tape is a double-side adhesive with one side for adhering the rubber frame and the other side for adhering the display panel.

Figure 2:
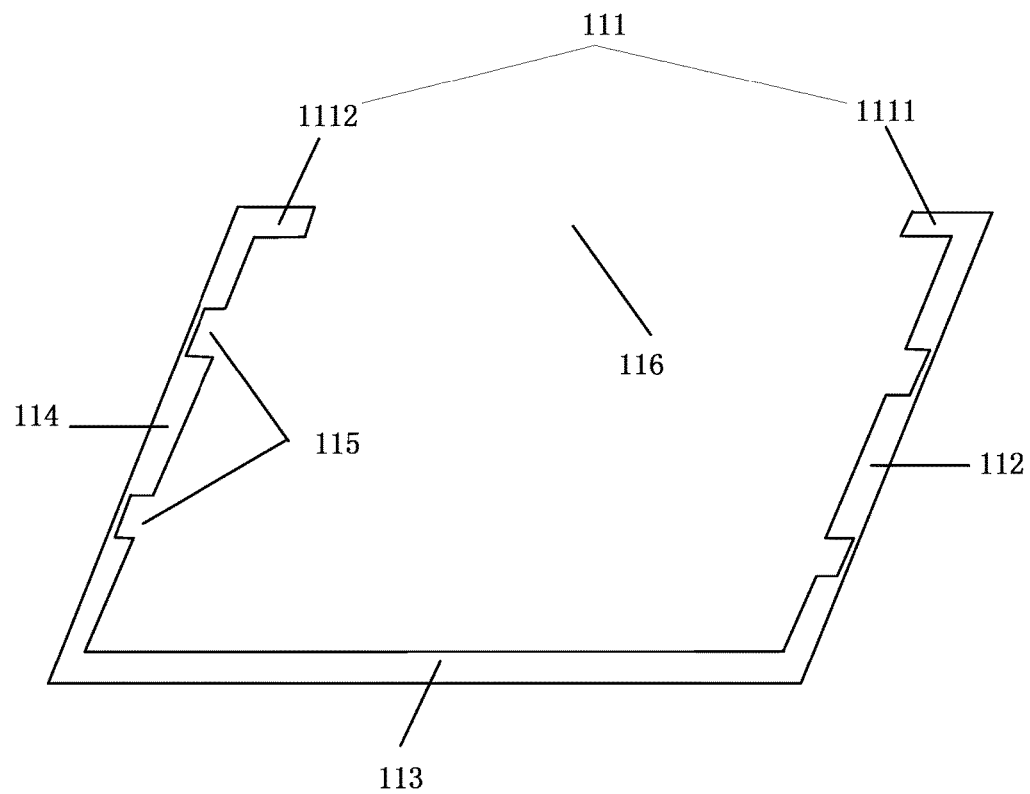
FIG. 2 is a top view of a rubber frame in some embodiments of the present disclosure.

Referring to FIG. 2, which is a top view of a rubber frame in some embodiments of the present disclosure, the rubber frame includes a soft rubber body formed by a first section 111, a second section 112, a third section 113 and a fourth section 114. The first section 111, the second section 112, the third section 113 and the fourth section 114 are connected to each other in an end-to-end manner. The first section 111 and the third section 113 are opposite to each other, and the second section 112 and the fourth section 114 are opposite to each other. The first section 111 is an upper section, and the first section 111 is provided with a first fixing portion 116 for receiving a display panel fixing adhesive tape. The first section 111 includes two separated parts, i.e., a first sub-section 1111 connected to the second section 112 and a second sub-section 1112 connected to the fourth section 114. The first fixing portion 116 is a gap between the first sub-section 1111 and the second sub-section 1112.

In some embodiments of the present disclosure, the display panel fixing adhesive tape is a double-side adhesive with one side for adhering the backlight module and the other side for adhering the display panel.

In some embodiments of the present disclosure, the rubber frame is provided with a first fixing portion for receiving the display panel fixing adhesive tape, so as to fix display panel by the display panel fixing adhesive tape, thereby preventing the display panel from detaching in the process of combining the display panel and the backlight module.

In some embodiments of the present disclosure, the first fixing portion is arranged in only one section (the first section 111 in some embodiments) to receive the display panel fixing adhesive tape, so that the display panel may be conveniently disassembled. In some embodiments of the present disclosure, a first fixing portion may be arranged in a plurality of sections, for example, a first fixing portion may be arranged in each of the first section 111 and the second section 113 to receive the display panel fixing adhesive tape, thereby fixing the display panel more firmly.

In some embodiments of the present disclosure, the first section 111 is an upper section, the third section 113 is a lower section, the so called upper section is a section corresponding to the upper edge of the display panel, and the lower section is a section corresponding to the lower edge of the display panel.

In some embodiments of the present disclosure, the second section 112 and the fourth section 114 are each provided with a film fixing portion 115 which is a fixing clamping slot, and the film fixing portion 115 is configured to fix the optical film in the backlight module, so as to avoid the displacement of the optical film, improve the light-emitting efficiency of the backlight module, and prevent the optical film from detaching when assembling the backlight module. The optical film is a light guide plate, a prism sheet, a diffusion sheet, and/or a radiation sheet. Correspondingly, the optical film is further provided with lugs matching with the fixing clamping slots.

In some embodiments, both the second section 112 and the fourth section 114 are provided with two film fixing portions 115. Of course, the number of the film holding portions 115 is not limited herein. In addition, in some embodiments of the present disclosure, the film fixing portion may be arranged in only one section.

A backlight module is further provided in some embodiments of the present disclosure, including a back plate and a backlight component and a rubber frame provided on the back plate, and the rubber frame is the rubber frame as described in any of the embodiments hereinabove.

Figure 3:
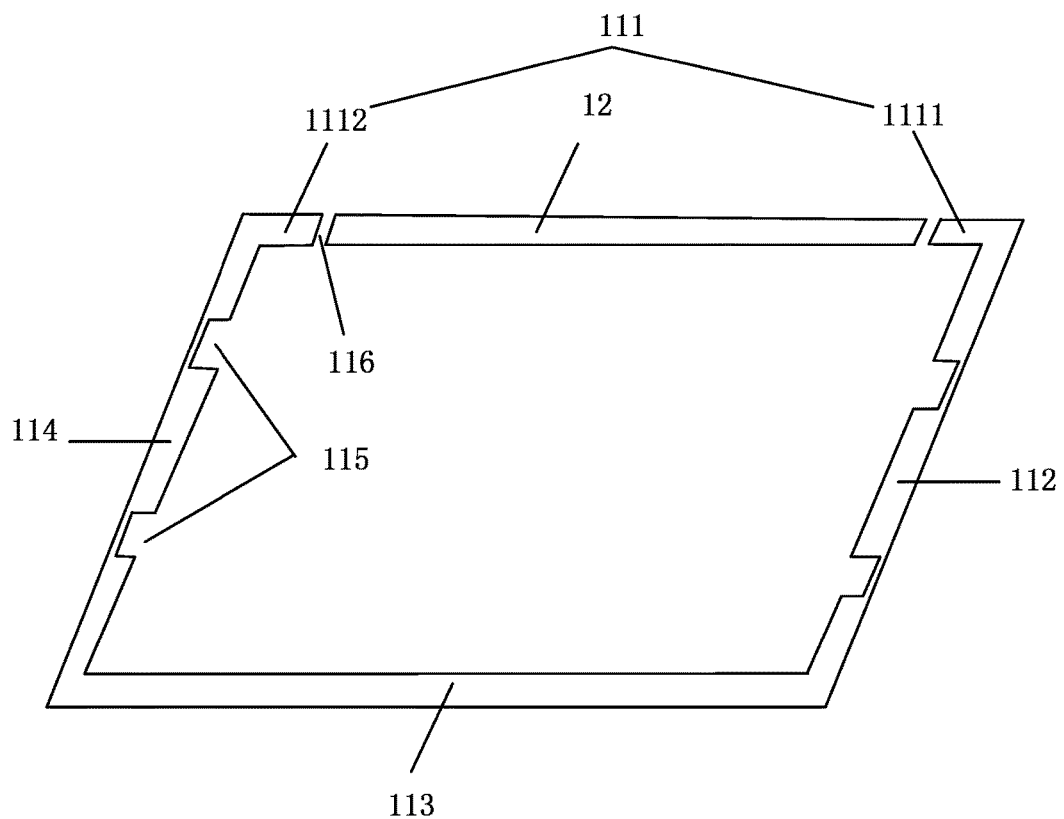
FIG. 3 is a top view of a backlight module in some embodiments of the present disclosure.

Referring to FIG. 3, which is a top view of a backlight module in some embodiments of the present disclosure, the backlight module includes a back plate (not shown) and a backlight component (not shown) and a rubber frame arranged on the back plate. The rubber frame includes a soft rubber body formed by a first section 111, a second section 112, a third section 113 and a fourth section 114. The first section 111, the second section 112, the third section 113 and the fourth section 114 are connected to each other in an end-to-end manner. The first section 111 and the third section 113 are opposite to each other, and the second section 112 and the fourth section 114 are opposite to each other.

The first section 111 is an upper section, and the first section 111 is provided with a first fixing portion 116 for receiving a display panel fixing adhesive tape. The first section 111 includes two separated parts, i.e., a first sub-section 1111 connected to the second section 112, and a second sub-section 1112 connected to the fourth section 114. The first fixing portion 116 is a gap between the first sub-section 1111 and the second sub-section 1112.

Figure 8:
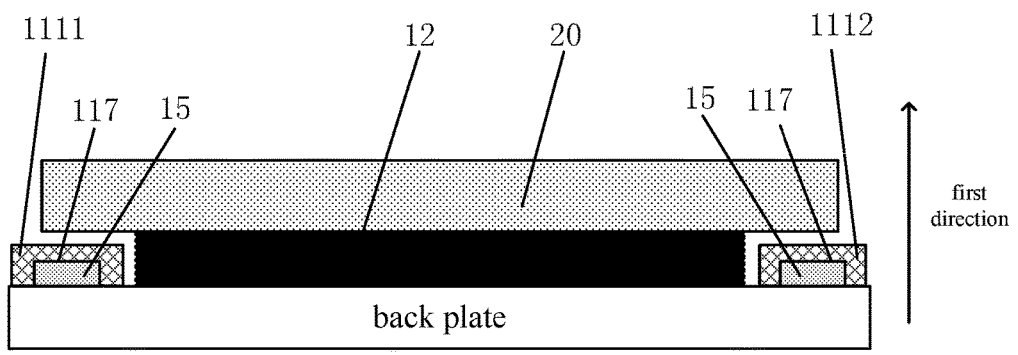
FIG. 8 is a sectional view of the combination of the backlight module and the display panel along line A-A shown in FIG. 7.

The backlight module further includes a display panel fixing adhesive tape 12 for fixing the display panel and arranged in the first fixing portion 116. A thickness of the display panel fixing adhesive tape 12 is greater than a thickness of the section of the rubber frame, whereby it may be guaranteed that the display panel can be in contact with the display panel fixing adhesive tape 12. For example, in some embodiments of the present disclosure, the display panel 20, the display panel fixing adhesive tape 12, the sections 1111, 1112 of the rubber frame, and the back plate may be arranged as shown in FIG. 8. As shown in FIG. 8, a thickness of the display panel fixing adhesive tape 12 extending from the upper surface of the back plate along a first direction is greater than a thickness of each of the sections 1111 and 1112 with the first fixing portion 116 extending from the upper surface of the back plate along the first direction. The first direction is perpendicular to the back plate and is directed from the back plate toward the display panel 20. The thickness of the section refers to a distance from the upper surface of the back plate on which the section is arranged to a surface of the section adjacent to the display panel, and the sections of the rubber frame have an identical thickness.

Optionally, a thickness difference between the display panel fixing adhesive tape 12 and the section of the rubber frame is less than a predetermined threshold value, so as to avoid a too large thickness difference between the display panel fixing adhesive tape 12 and the section which results in cracks of the display panel in a joining region of the display panel and the section.

Optionally, the thickness of the display panel fixing adhesive tape 12 is greater than the thickness of the section of the rubber frame by 0.02 to 0.05 mm.

Optionally, a width of the display panel fixing adhesive tape 12 is identical to a width of the section (the first section 111 in some embodiments) with the first fixing portion 116, so as to avoid the occurrence of cracks in the display panel.

Figure 4:
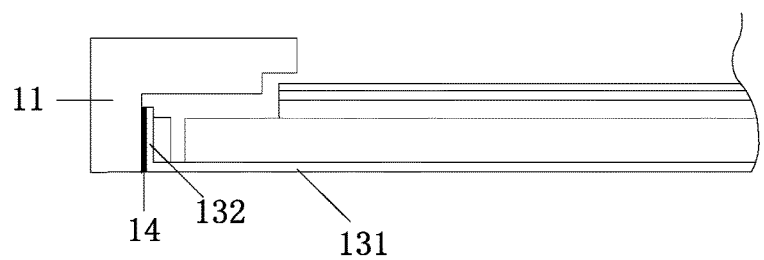
FIG. 4 is a sectional view of a backlight module in some embodiments of the present disclosure.

In some embodiments of the present disclosure, the rubber frame may be adhered to the back plate by a double-side adhesive. As shown in FIG. 4, the back plate includes a bottom plate 131 and a side plate 132, and the rubber frame 11 may be fixed to the side plate 132 by a rubber frame fixing adhesive tape 14.

Figure 5:
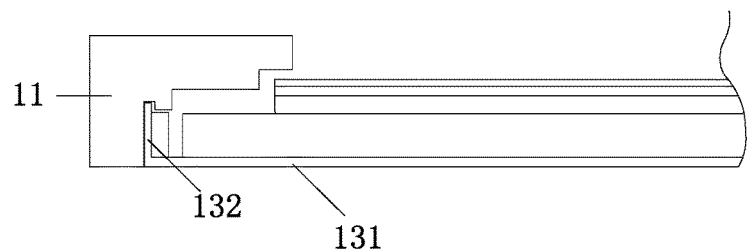
FIG. 5 is a sectional view of a backlight module in some embodiments of the present disclosure.

Optionally, as shown in FIG. 5, the rubber frame 11 may be provided with a snap, and the rubber frame may be fixed to the back plate by the snap structure.

Of course, the above two embodiments are merely illustrative, and in some embodiments of the present disclosure, the rubber frame may be fixed to the back plate by other means.

Figure 6:
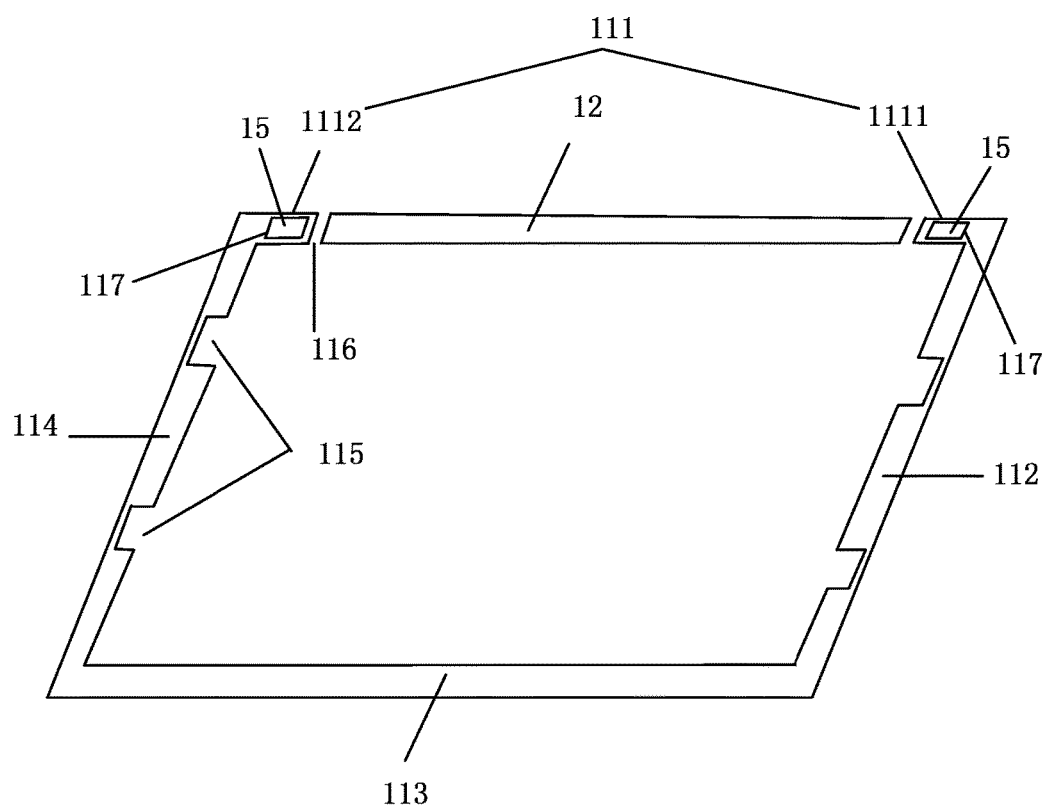
FIG. 6 is a top view of a backlight module in some embodiments of the present disclosure.

Referring to FIG. 6, which is a top view of a backlight module in some embodiments of the present disclosure, each of the first sub-section 1111 and the second sub-section 1112 is provided with a second fixing portion 117 for receiving a rubber frame fixing adhesive tape. The backlight module further includes a rubber frame fixing adhesive tape 15 arranged in a second fixing portion 117, the rubber frame fixing adhesive tape 15 is adhered to the surfaces of the first sub-section 1111 and the second sub-section 1112 toward the back plate, so as to prevent the first section 111 with the first fixing portion 116 from detaching. Optionally, the second fixing portion 117 is a groove arranged in the corresponding section, so that the thickness of the section for receiving the rubber frame fixing adhesive tape is not greater than the thickness of any of the other sections. For example, in some embodiments of the present disclosure, the rubber frame fixing adhesive tape 15 may be arranged in the second fixing portion 117, and the display panel 20, the display panel fixing adhesive tape 12, the sections 1111 and 1112 of the rubber frame, the second fixing portion 117, the rubber frame fixing adhesive tape 15, and the back plate are arranged as shown in FIG. 8.

Figure 7:
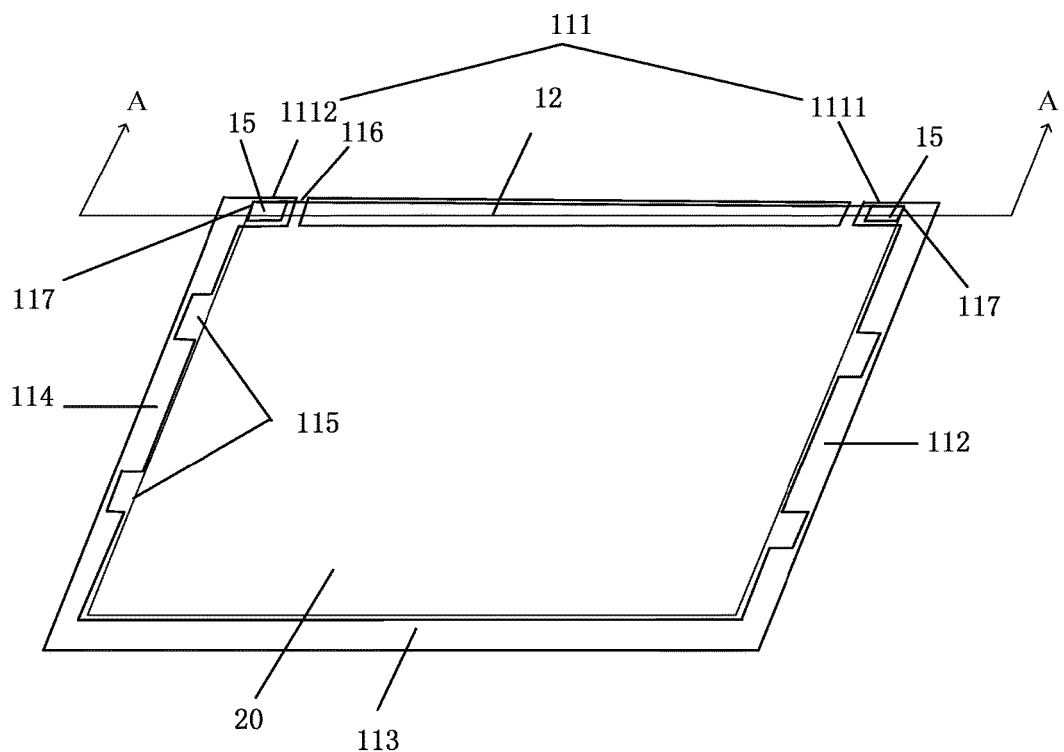
FIG. 7 is a schematic view of a combination of a backlight module and a display panel in some embodiments of the present disclosure.

Referring to FIG. 7, FIG. 7 is a schematic diagram of a combination of a backlight module and a display panel in some embodiments of the present disclosure. As shown in FIG. 7, the reference number 20 represents a display panel.

A display device is further provided by the present disclosure, including a backlight module according to any of the above embodiments.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A rubber frame, applied to a backlight module, comprising a soft rubber body, wherein the soft rubber body comprise a first section, a second section, a third section and a fourth section, and at least one section is provided with a first fixing portion configured to fix a display panel;
   wherein the section with the first fixing portion comprises a first sub-section and a second sub-section which are separated from each other, and the first fixing portion is a gap between the first sub-section and the second sub-section.

2. The rubber frame according to claim 1, wherein the first fixing portion is a groove arranged in the at least one section.

3. The rubber frame according to claim 1, wherein the first fixing portion is arranged in the first section, and the first section is an upper section.

4. The rubber frame according to claim 1, wherein the first fixing portion is configured to receive a display panel fixing adhesive tape.

5. The rubber frame according to claim 1, wherein at least one section is provided with a second fixing portion configured to receive a rubber frame fixing adhesive tape.

6. The rubber frame according to claim 5, wherein the second fixing portion is a groove arranged in the at least one section.

7. The rubber frame according to claim 1, wherein at least one section is provided with a film fixing portion configured to fix an optical film in the backlight module.

8. The rubber frame according to claim 7, wherein each of the second section and the fourth section is provided with the film fixing portion, the second section is a right section, and the fourth section is a left section.

9. The rubber frame according to claim 1, wherein the first section, the second section, the third section and the fourth section are connected to each other in an end-to-end manner, the first section and the third section are opposite to each other, and the second section and the fourth section are opposite to each other;
   the first section, the second section, the third section and the fourth section have an identical thickness.

10. The rubber frame according to claim 8, wherein the film fixing portion is a fixing clamping slot.

11. A backlight module, comprising a back plate and a backlight component and a rubber frame arranged on the back plate;
   wherein the rubber frame comprises a soft rubber body comprising a first section, a second section, a third section and a fourth section, and at least one section is provided with a first fixing portion configured to fix a display panel;
   the backlight module further comprises a display panel fixing adhesive tape arranged in the first fixing portion, wherein a thickness of the display panel fixing adhesive tape is greater than a thickness of the section with the first fixing portion.

12. The backlight module according to claim 11, wherein the thickness of the display panel fixing adhesive tape is greater than the thickness of the section with the first fixing portion by 0.02 to 0.05 millimeters.

13. The backlight module according to claim 11, wherein a width of the display panel fixing adhesive tape is identical to a width of the section with the first fixing portion.

14. The backlight module according to claim 11, wherein at least one section is provided with the second fixing portion, and the backlight module further comprises a rubber frame fixing adhesive tape arranged in the second fixing portion and configured to fix the rubber frame to the back plate.

15. The backlight module according to claim 11, wherein a thickness of the display panel fixing adhesive tape extending from the back plate along a first direction is greater than a thickness of the section with the first fixing portion extending from the back plate along the first direction;
   wherein the first direction is perpendicular to the back plate and directed from the back plate to the display panel.

16. The backlight module according to claim 14, wherein the rubber frame fixing adhesive tape is adhered onto a surface of the at least one section toward the back plate.

17. The backlight module according to claim 14, wherein the second fixing portion is a groove arranged in the at least one section.

18. A display device, comprising a backlight module, wherein the backlight module comprises: a back plate and a backlight component and a rubber frame arranged on the back plate;
   wherein the rubber frame comprises a soft rubber body comprising a first section, a second section, a third section and a fourth section, and at least one section is provided with a first fixing portion configured to fix a display panel;
   wherein at least one section is provided with the second fixing portion, and the backlight module further comprises a rubber frame fixing adhesive tape arranged in the second fixing portion and configured to fix the rubber frame to the back plate.

* * * * *